US012633657B2

(12) United States Patent
Liu et al.

(10) Patent No.: US 12,633,657 B2
(45) Date of Patent: May 19, 2026

(54) PHASE SHIFTER, ANTENNA AND BASE STATION CONTAINING THE PHASE SHIFTER

(71) Applicant: Telefonaktiebolaget LM Ericsson (publ), Stockholm (SE)

(72) Inventors: Jiatong Liu, Beijing (CN); Peiguang Lu, Beijing (CN); Jianlan Li, Beijing (CN); Zhongliang He, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 18/260,832

(22) PCT Filed: Nov. 26, 2021

(86) PCT No.: PCT/CN2021/133508
§ 371 (c)(1),
(2) Date: Jul. 10, 2023

(87) PCT Pub. No.: WO2022/151845
PCT Pub. Date: Jul. 21, 2022

(65) Prior Publication Data

US 2024/0063540 A1 Feb. 22, 2024

(30) Foreign Application Priority Data

Jan. 15, 2021 (CN) ......................... 202120120317.4

(51) Int. Cl.
*H01Q 3/36* (2006.01)
*H01Q 3/32* (2006.01)
(Continued)

(52) U.S. Cl.
CPC ................. *H01Q 3/36* (2013.01); *H01Q 3/32* (2013.01); *H01P 1/18* (2013.01); *H01P 1/184* (2013.01); *H01Q 1/246* (2013.01)

(58) Field of Classification Search
CPC . H01Q 3/36; H01Q 3/32; H01Q 1/246; H01P 1/184
(Continued)

(56) References Cited

U.S. PATENT DOCUMENTS 3,139,597 A 6/1964 French et al.
6,075,424 A 6/2000 Hampel et al.
(Continued)

FOREIGN PATENT DOCUMENTS

CN 104508908 A 4/2015
CN 204596924 U 8/2015
(Continued)

OTHER PUBLICATIONS

Extended European Search Report mailed Nov. 14, 2024 for European Patent Application 21919036.0, 11 pages.

*Primary Examiner* — Chuong P Nguyen
(74) *Attorney, Agent, or Firm* — Sage Patent Group

(57) ABSTRACT

The embodiment of the present disclosure provides a phase shifter, including a cavity, a dielectric phase shifting unit located in the cavity, and a signal transmission line. The dielectric phase shifting unit is located between the cavity shell and a part of the signal transmission line. The dielectric phase shifting unit includes at least one dielectric block with a circular cross-section, and its thickness is gradually changed with the circle center as the center. It uses the rotation of the dielectric block instead of sliding to change the relative dielectric constant of the air strip line, which saves the current extension space required for the sliding of the dielectric block, and obtains a continuously adjustable small-size phase shifter, thereby enabling the miniaturization of the base station.

9 Claims, 4 Drawing Sheets

(51) Int. Cl.
*H01P 1/18* (2006.01)
*H01Q 1/24* (2006.01)

(58) Field of Classification Search
USPC .................................................. 342/368, 372
See application file for complete search history.

(56) References Cited

U.S. PATENT DOCUMENTS

| | | | | |
|---|---|---|---|---|
| 8,912,974 | B2 * | 12/2014 | Green | H01Q 9/0478 343/860 |
| 9,780,425 | B2 * | 10/2017 | Liu | H01Q 3/30 |
| 10,062,940 | B2 * | 8/2018 | Liu | H01P 1/182 |
| 2017/0005387 | A1 | 1/2017 | Hsu et al. | |
| 2017/0069941 | A1 | 3/2017 | Liu et al. | |
| 2019/0123412 | A1 * | 4/2019 | Michaelis | G02B 26/005 |
| 2020/0067159 | A1 * | 2/2020 | Chen | H01Q 3/32 |
| 2023/0361441 | A1 * | 11/2023 | Choi | H01P 5/12 |
| 2025/0174879 | A1 * | 5/2025 | Xiao | H01Q 1/50 |

FOREIGN PATENT DOCUMENTS

| | | | | | |
|---|---|---|---|---|---|
| CN | 106887705 | A | * | 6/2017 | H01Q 3/32 |
| CN | 108879035 | A | | 11/2018 | |
| CN | 109314292 | A | | 2/2019 | |
| CN | 111490317 | A | * | 8/2020 | H01Q 3/32 |
| CN | 108879035 | B | * | 11/2021 | H01P 1/184 |
| CN | 119275537 | A | * | 1/2025 | H01Q 3/36 |
| EP | 1898492 | A2 | * | 3/2008 | H01P 1/184 |
| EP | 3547446 | A1 | * | 10/2019 | H01P 1/184 |
| JP | 2002158502 | A | | 5/2002 | |

* cited by examiner

PHASE SHIFTER, ANTENNA AND BASE STATION CONTAINING THE PHASE SHIFTER

TECHNICAL FIELD

The present disclosure relates to the field of mobile communication, in particular to a phase shifter, an antenna and a base station.

BACKGROUND

As mobile communication technology evolves to the next generation, the demand for miniaturization of base stations is becoming stronger, and the number of antennas continues to increase, making it more difficult to miniaturize base station antenna systems.

A phase shifter is a device that can adjust the phase of a radio frequency (RF) signal, so it is widely used in the antenna system of a radio base station. There are usually two ways to achieve phase adjustment: one is to change the physical length of the signal propagation path, and the other is to change the dielectric constant of part of the signal propagation path to affect the signal propagation speed.

Both of the above two main phase adjustment approaches require physical mechanical sliding to achieve the phase shift function. Ways to adjust the length of the signal propagation path include the scheme of changing the electrical length through traditional metal sliding, and the scheme of microstrip line coupling. A sufficient amount of phase shift has a certain requirement for the path length, and there is a corresponding requirement for the space used to realize the sliding, so it cannot cope with the miniaturization requirement of the antenna system.

In terms of the complexity of the manufacturing process, the scheme of changing the dielectric constant of the propagation path is simpler than the microstrip line coupling scheme and thus has gradually become the mainstream scheme of the phase shifter. This dielectric sliding type phase shifter changes the dielectric constant of the propagation path by sliding the dielectric block covering around the propagation path. The requirement for sliding space is still large, so it still cannot cope with the demand for miniaturization of the antenna system.

SUMMARY

The first purpose of the present disclosure is to provide a small-sized dielectric phase shifter.

Another object of the present disclosure is to provide an antenna using the above phase shifter.

Another object of the present disclosure is to provide a base station using the above antenna.

In order to achieve the above objectives, the present disclosure provides the following technical solutions.

A phase shifter includes a cavity, a dielectric phase shifting unit located in the cavity, and a signal transmission line. The dielectric phase shifting unit is located between the cavity shell and a part of the signal transmission line. The dielectric phase shifting unit includes at least one dielectric block with a circular cross-section, and the thickness is gradually changed with the circle center as the center.

Optionally, the embodiment of the present disclosure is further provided that the phase shifter further includes a rotating shaft located at the shaft center of the above dielectric block, so that the dielectric block rotates with the circle center as the shaft center.

Optionally, the embodiment of the present disclosure is further provided that the dielectric phase shifting unit further includes another dielectric block with a circular cross section, and its thickness is gradually changed with the circle center as the center. It is mirrored and symmetrical with the first dielectric block, forming a pair of dielectric blocks of gradually changing thickness, and a part of the signal transmission line is clamped in the middle. The above rotating shaft passes through the center of the pair of dielectric blocks and drives them to rotate. Compared with a single dielectric block with the same cross section, the dielectric block can increase the amount of phase shift that can be achieved.

Optionally, the embodiment of the present disclosure is further provided that the overlapping portion of the signal transmission line and the dielectric phase shifting unit is curved back and forth. This can also increase the amount of phase shift that can be achieved.

Optionally, the embodiment of the present disclosure is further provided that the phase shifter further includes a gear, which is located on the outer surface of the cavity and is combined with the rotating shaft to drive the rotation of the rotating shaft, thereby driving the rotation of the dielectric phase shifting unit, i.e., the dielectric block or dielectric block pair.

Optionally, the embodiment of the present disclosure is further provided that the phase shifter further includes a low-pass filter, which is connected in series with the signal transmission line and is located in the cavity.

The embodiment of the phase shifter of the present disclosure is a dielectric rotating type phase shifter, which uses the rotation of the dielectric block instead of sliding to change the relative dielectric constant of the air strip line. This saves the current extension space required for the sliding of the dielectric block, and a continuously adjustable small phase shifter is obtained, so that the miniaturization of the base station can be realized.

The embodiment of the present disclosure also provides an antenna including the above phase shifter, and a base station including the antenna.

BRIEF DESCRIPTION OF THE DRAWINGS

The drawings herein are incorporated into the specification and constitute a part of the specification, which show embodiments conforming to the disclosure, and together with the specification are used to explain the principle of the disclosure.

In order to more clearly describe the technical solutions in the embodiments of the present disclosure or the prior art, the following will briefly introduce the drawings that need to be used in the description of the embodiments or the prior art. Obviously, for those of ordinary skill in the art, other drawings may be obtained based on these drawings without creative labor.

DETAILED DESCRIPTION

Figure 1:
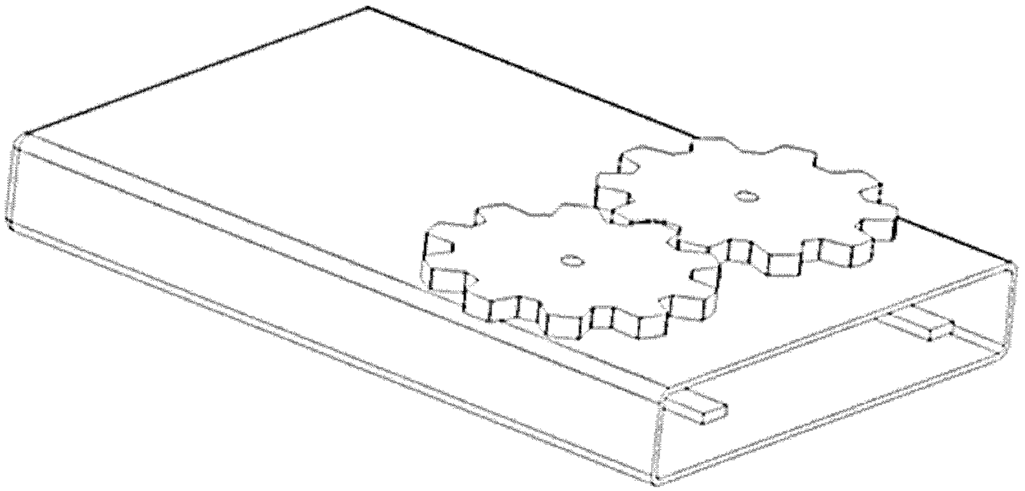
FIG. 1 is a schematic diagram of the appearance of a phase shifter according to an embodiment of the present disclosure.

In order to be able to understand the above objectives, features and advantages of the present disclosure more clearly, the solutions of the present disclosure will be further described below. It should be noted that the embodiments of the present disclosure and the features in the embodiments may be combined with each other if there is no conflict. Some examples of these embodiments are shown in the drawings, in which the same or similar reference numerals represent the same or similar elements or elements with the same or similar functions. The embodiments described below with reference to the drawings are only exemplary, and are only used to explain the present disclosure, and may not be construed as a limitation to the present disclosure.

It should be noted that when an element is referred to as being "fixed to" or "disposed on" another element, it may be directly on the other element or indirectly on the other element. When an element is referred to as being "connected to" another element, it may be directly connected to the other element or indirectly connected to the other element.

It should be understood that the orientation or positional relationship indicated by the terms "length", "width", "upper", "lower", "front", "rear", "left", "right", "longitudinal", "horizontal", "top", "bottom", "inner", "outer", etc., are based on the orientation or positional relationship shown in the drawings, and are only for the convenience of describing the present disclosure and simplifying the description, rather than indicating or implying the referred device or element must have a specific orientation, or be constructed and operated in a specific orientation, and therefore cannot be understood as a limitation to the present disclosure.

At present, even the dielectric sliding type phase shifter still needs a large space (mainly referring to the horizontal area) to cope with the sliding of the dielectric block. Therefore, especially in base station antennas with a large number of antennas, the demand for miniaturization is more difficult to be satisfied. The embodiments of the present disclosure provide the following implementation solutions.

Figure 2:
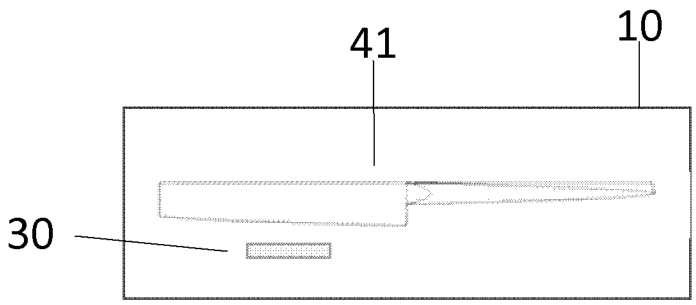
FIG. 2 is a schematic diagram of a longitudinal section of a phase shifter according to an embodiment of the present disclosure.

FIG. 1 is a schematic diagram of the appearance of a phase shifter according to an embodiment of the present disclosure. FIG. 2 is a schematic diagram of a longitudinal section of a phase shifter according to an embodiment of the present disclosure. The phase shifter may be used in a base station antenna system to realize beamforming or beam scanning of an antenna array. Specifically, as shown in FIG. 1 and FIG. 2, a phase shifter according to this embodiment includes a cavity 10, a dielectric phase shifting unit 41 and a signal transmission line 30 located in the cavity. The dielectric phase shifting unit is located between the upper shell of the cavity and the signal transmission line. The dielectric phase shifting unit includes at least one dielectric block 41 with a gradually changing thickness and a circular cross section (hereinafter referred to as a circular dielectric block), and the dielectric block rotates around a circle center.

Using this phase shifter, the equivalent dielectric constant of the signal transmission line 30 may be changed by rotating the circular dielectric block 41, thereby changing the signal transmission phase to realize the phase shift function. The dielectric block may be a material with a high dielectric constant, such as ceramics, plastics, etc., which facilitates to realize a large range of phase shift. By rotating the circular dielectric block, the change in the thickness of the dielectric block of the overlapping portion with the signal transmission line affects the change in the relative dielectric constant of the composite dielectric composed of the dielectric block and air, that is, it changes the rate at which the phase shifter transmits electromagnetic waves and achieves the phase shift function.

The upper and lower shells of the cavity 10 serve as ground plates, and the signal transmission line is interposed in the air dielectric of the two ground plates, forming a signal transmission line as an air strip line. The loss per unit length of the air strip line is much smaller than that of the microstrip line, which may reduce the loss of the phase shifter. On the other hand, because the microstrip line needs more solder joints, the passive intermodulation (PIM) effect of the base station antenna that uses the changed dielectric constant is smaller than the PIM effect of the base station antenna that uses the microstrip line.

In the internal structure of the phase shifter shown in FIG. 2, the cavity 10 is used as an electromagnetic shielding cover to wrap the dielectric block 41 and the signal transmission line 30. The dielectric block 41 is between the upper wall of the cavity 10 and part of the signal transmission line 30. As the circular dielectric block 41 with a gradually changing thickness rotates, the dielectric constant of the overlapping portion of the signal transmission line and the dielectric block changes. Since the way of changing the dielectric constant is the in-situ rotation of the dielectric block, this rotary motion does not require additional space compared with the sliding of the dielectric block in the prior art, thereby realizing a continuously adjustable small-size phase shifter.

Those skilled in the art may contemplate that the circular dielectric block in this embodiment does not need to be a precise circle. For example, an elliptical dielectric block, a ring-shaped dielectric block with spokes, etc., can achieve similar effects, that is, the rotation of the dielectric block does not require the extension of the space caused by sliding (the ellipse may need a space only slightly larger than the major axis), and the characteristic of the gradually changing thickness also makes the rotation bring about the effect of phase shift. Therefore, those skilled in the art may understand that the above elliptical or ring-shaped dielectric block with gradually changing thickness also belongs to the concept of "circular" gradually changing dielectric block in the present disclosure.

In the embodiment of the present disclosure, the part of the signal transmission line 30 that spatially overlaps the dielectric block may also be referred to as a phase-shifting conductor strip, and the part exposed from the cavity 10 seen from the angle of FIG. 1 is the signal input and output terminals. In another embodiment not shown, the dielectric block 43 having the same or similar shape as the circular dielectric block 41 locates on the other side of the phase-shifting conductor strip, which forms a pair of circular dielectric blocks with the circular dielectric block 41, thereby achieving a larger amount of phase shift.

Figure 3:
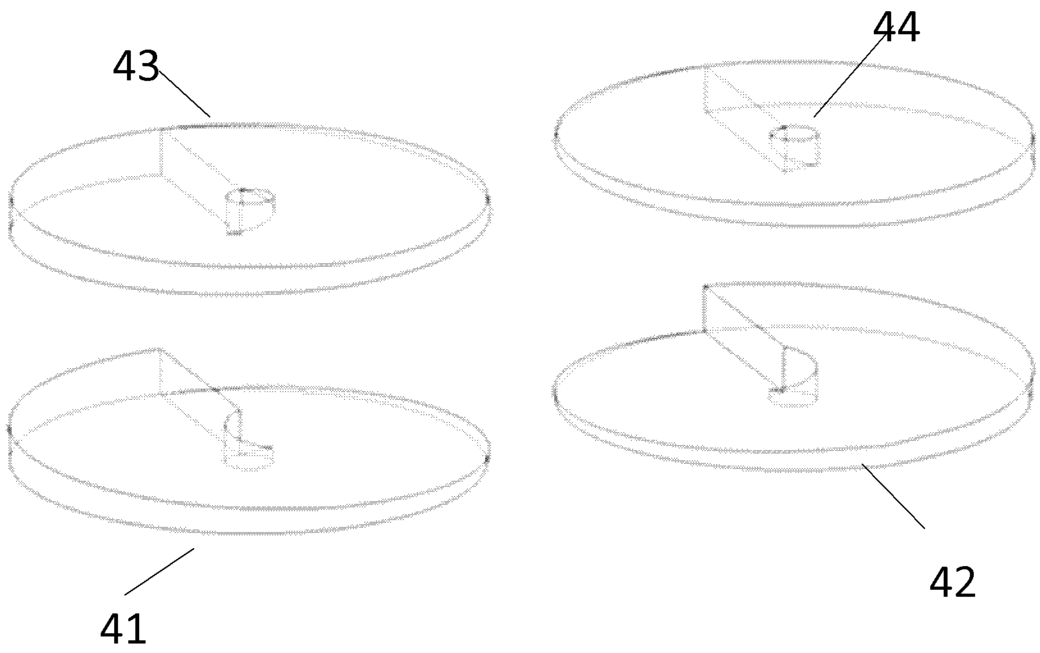
FIG. 3 is a schematic diagram of a dielectric phase shifting unit of a phase shifter according to an embodiment of the present disclosure.
Figure 4:
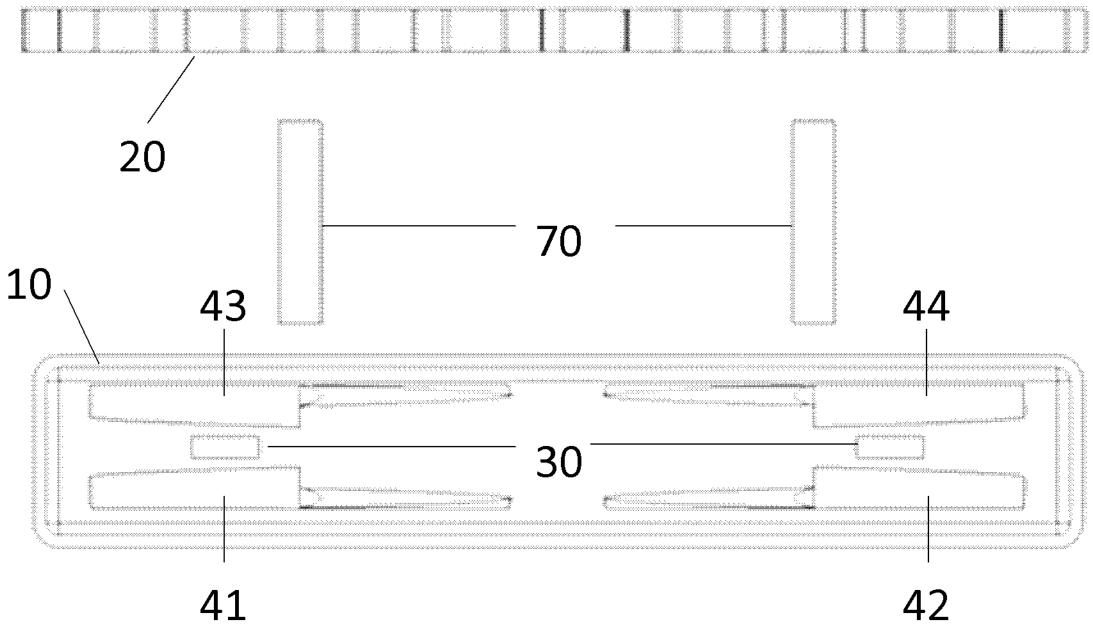
FIG. 4 is a split schematic diagram of a longitudinal section of the phase shifter according to the embodiment shown in FIG. 3.

FIG. 3 and FIG. 4 show schematic diagrams of a longitudinal section of a dielectric block of a phase shifter and a longitudinal section of the inside of the phase shifter according to another embodiment. Among them, the dielectric blocks 41 and 43 are a pair of dielectric blocks with a circular cross-section and a gradually changing thickness, and the dielectric blocks 42 and 44 are another pair of dielectric blocks with the same or similar shapes. As shown in FIG. 3, the relative position between each pair of dielectric blocks is mirror symmetry. In FIG. 4, the signal transmission line 30 is clamped between the dielectric blocks 41 and 43 and between the dielectric blocks 44 and 42, respectively indicating the direction of signal inflow and outflow, which is equivalent to clamping the signal transmission line with two pairs of dielectric blocks. The amount of phase shift achieved is doubled compared with a pair of dielectric blocks.

It can be seen from FIG. 4 that the two pairs of circular gradual dielectric blocks respectively rotate around two rotating shafts 70 located at the center of their circles, that is, the rotating shafts drive the dielectric blocks to rotate. To realize the rotation driven by the rotating shaft 70, the rotating shaft may be fixed on the dielectric block during operation. The fixing way between the rotating shaft 70 and the dielectric blocks 41 to 44 may be close contact and driven by friction, or driven by transmission through pinion meshing and sleeve, or integrally formed, or glued and fixed after insertion, and so on. In an embodiment provided in the present disclosure, the phase shifter includes a rotating shaft 70 and a gear 20, and the rotating shaft 70 is driven by the gear 20. The gear 20 may be located outside the cavity 10, as shown in FIG. 1, close to or near the upper surface of the cavity, and the gear 20 is driven to rotate by the transmission mechanism of the antenna system. In another embodiment, the gear 20 itself is a part of the transmission mechanism of the antenna system. The two gears mesh with each other, and only one transmission power is needed to make the two gears operate at the same time.

When the first gear rotates clockwise, the second gear rotates counterclockwise. During the operation of the phase shifter, as the thickness of the dielectric block overlapping around the phase-shifting conductor strip changes, the phase flowing through the transmission signal line also changes. FIG. 4 shows the working moment, the thickest parts of the two pairs of dielectric blocks in the cavity clamp the phase-shifting conductor strip. As the gear 20 drives the rotation of the dielectric blocks 41-44, the dielectric blocks around the phase-shifting conductor strip gradually becomes thinner.

Figure 5:
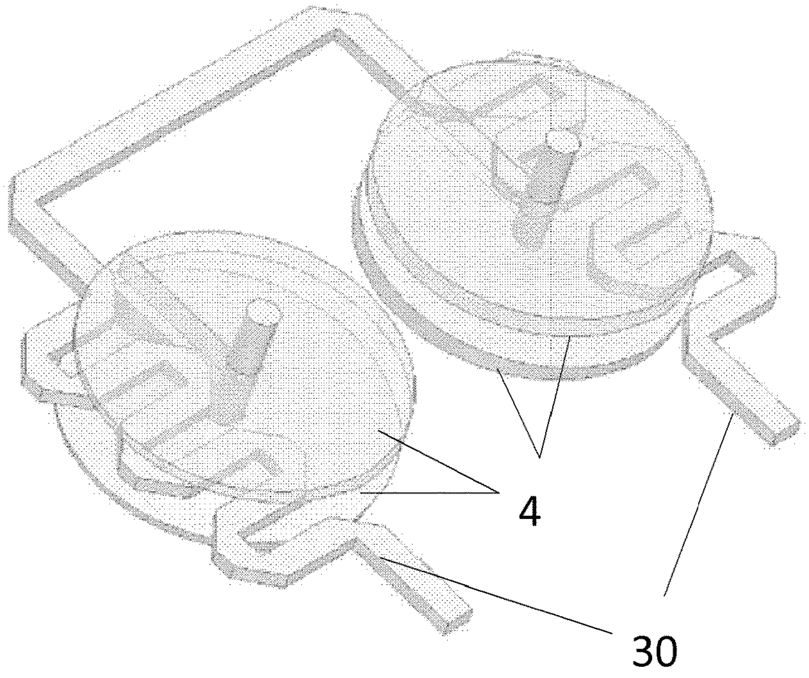
FIG. 5 is a schematic diagram of the internal structure of the cavity of a phase shifter according to an embodiment of the present disclosure.

Based on the above disclosure, those skilled in the art may think of various optimizations and modifications of the above embodiments. FIG. 5 is a modified embodiment of the embodiments shown in FIG. 3 and FIG. 4. In order to increase the length of the phase-shifting conductor strip as much as possible, the overlapping portion of the transmission signal line with the dielectric block is replaced from a shape of a straight line to a shape of a curved back and forth line. What may be the same as the embodiments in FIG. 3 and FIG. 4 is the design of the gate-shaped transmission signal line, and the two pairs of circular gradual dielectric blocks arranged on the left back of the gate-shaped signal line.

In the embodiment shown in FIG. 5, assuming a more specific scenario, when the operating frequency is 3.5 GHz, and when the diameter of the circular gradual dielectric block is 10 mm, and the maximum thickness of each dielectric block is 1 mm, the amount of phase shift that can be achieved will vary depending on the dielectric constant of the selected dielectric block. For example, when the dielectric constant is 4.4, the amount of phase shift achieved is 26.75°; when the dielectric block with the dielectric constant of 7 is selected, the amount of phase shift achieved is 32.1°; when the dielectric constant is increased to 20, the amount of phase shift achieved is 39.2°. In actual application scenarios, various factors such as cost, the demand for the phase shift amount, the area/volume that the phase shifter may occupy, etc., will be considered to select the dielectric block. In order to try more possibilities, in another set of embodiments, a phase shift amount of 40° may be achieved by keeping the operating frequency and the diameter of the dielectric block unchanged, adjusting the maximum thickness of the gradual dielectric block to 2 mm, and selecting a dielectric block with a dielectric constant of 7. When the dielectric constant increases to 20, a phase shift amount of 50.3° may be achieved. Those skilled in the art may select the parameters among the various factors disclosed in the present disclosure according to actual needs to achieve their goals.

Figure 6:
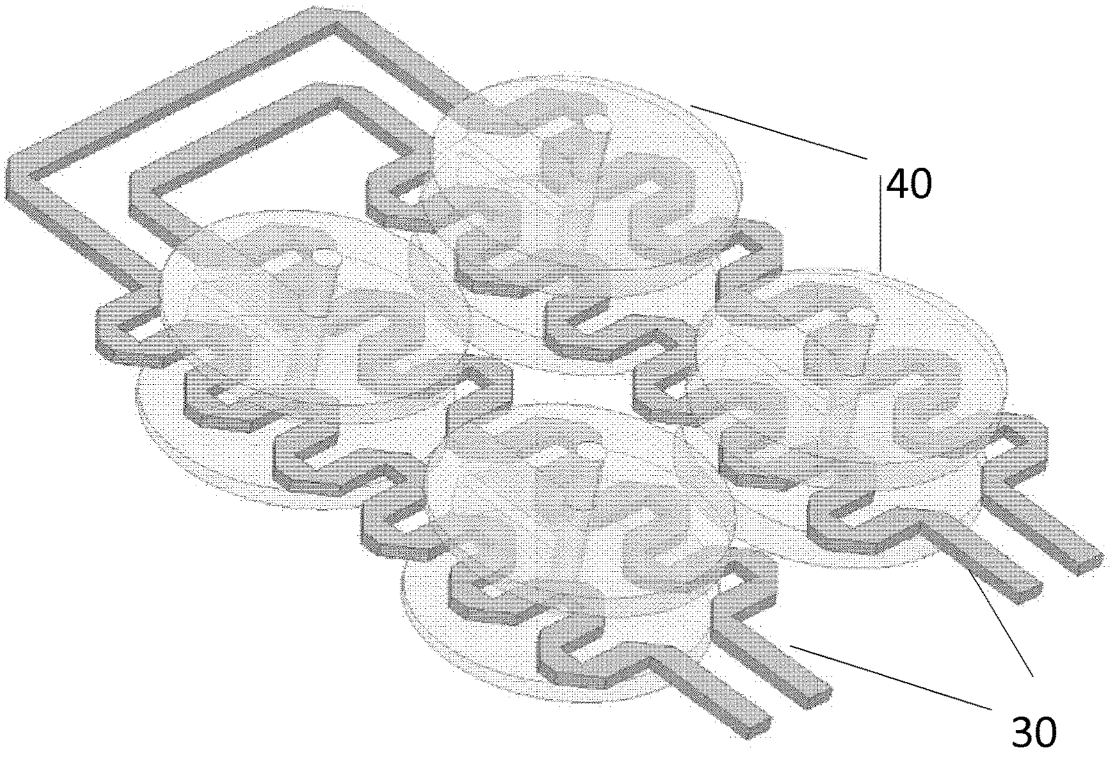
FIG. 6 is a schematic diagram of the internal structure of the cavity of a two-way phase shifter according to an embodiment of the present disclosure.

In order to further increase the amount of phase shift, more gradual dielectric blocks may clamp along the signal transmission line. In a design with ample horizontal size, for example, as shown in FIG. 6, four pairs of circular gradual dielectric blocks are tiled along the signal transmission line; or in a design with more limited horizontal size and ample longitudinal size, the signal transmission line is folded in half in the longitudinal direction, and when the upper and lower pairs of gradual dielectric blocks clamping along the line overlap in the longitudinal direction, they can even share the same rotating shaft. In this way, the achievable phase shift amount can be doubled again under the condition that the horizontal area remains unchanged. When the achievable phase shift amount exceeds the required phase shift amount, the circular area of the gradual dielectric block can be adaptively reduced, and the occupied area of the entire cavity can be reduced again, achieving the miniaturization of the base station antenna area to a greater extent.

Under the premise of using the above size parameters and realizing the same phase shift amount, when the dielectric constant is selected as 4.4, the size of the traditional dielectric sliding type phase shifter is roughly 75 mm*15 mm*7 mm (length*width*height), and when the dielectric rotating type phase shifter according to the embodiment shown in FIG. 5 is adopted, it has a size of approximately 40 mm*25 mm*8 mm (length*width*height). The extra height includes the thickness of the gear outside the cavity, because the sliding handle of the traditional dielectric sliding type phase shifter for comparison is linked on the same side of the cavity and the signal transmission line. Compared with the traditional dielectric sliding type phase shifter, the size is wider because the two pairs of circular dielectric blocks are arranged in parallel, and those skilled in the art may easily contemplate that when the two pairs of circular dielectric blocks are slightly misaligned in the length direction, narrowing in the width direction can be achieved. Therefore, the embodiments in the present disclosure are merely examples, and those of ordinary skill in the art can change, modify, replace, and deform these embodiments within the scope of the present disclosure.

The embodiments shown in FIG. 1 to FIG. 5 are single-channel signal phase shifters, and similarly designed phase shifters can also be applied to multi-channel signals. For the sake of brevity, FIG. 6 is still used as an illustration. In another embodiment shown in FIG. 6, four pairs of circular gradual dielectric blocks clamp two parallel gate-shaped signal transmission lines. Continuing the curved back and forth design shown in FIG. 5, at the left and right sides of each gate-shaped line, two pairs of circular gradual dielectric blocks respectively clamp to achieve the largest possible phase shift in a limited space. Those skilled in the art may contemplate that more transmission lines may be tiled here in parallel to the two transmission lines. In order to obtain a larger amount of phase shift, the beam part of the gate-shaped line may also be clamped with a gradual dielectric block, or the wiring density of the line curved back and forth may be increased.

Figure 7:
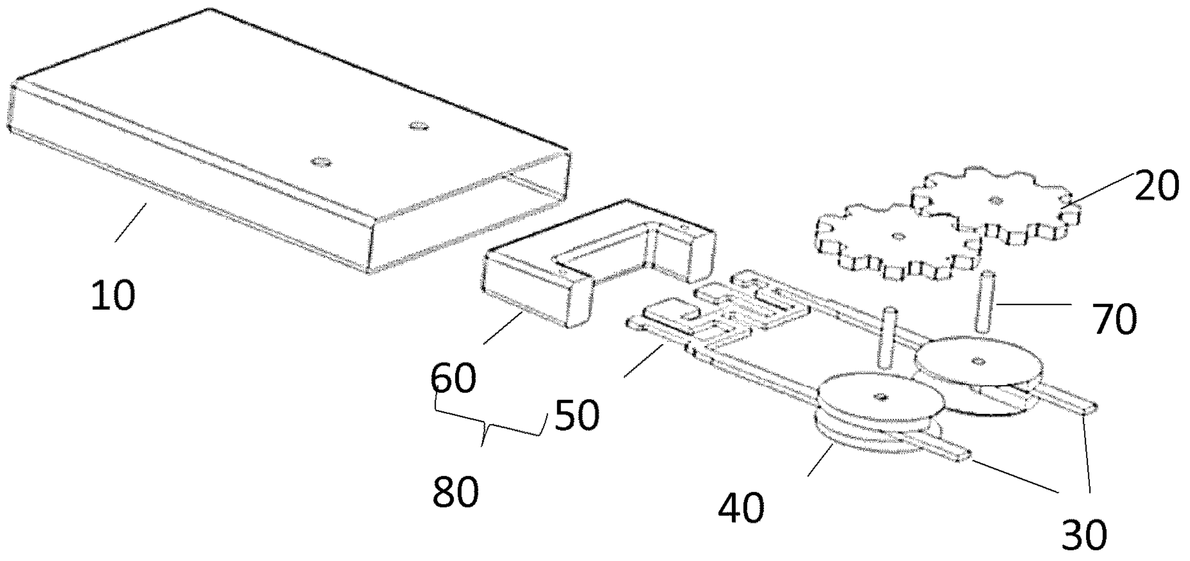
FIG. 7 is a split schematic diagram of the internal structure of a phase shifter integrated with a low-pass filter according to an embodiment of the present disclosure.

In a further embodiment, the low-pass filter of the antenna system may be integrated into the cavity of the phase shifter, as shown in FIG. 7. The phase shifter integrated with a low-pass filter includes: a cavity 10, a signal transmission line 30 located in the cavity, two pairs of circular gradual dielectric blocks 40, a rotating shaft 70 of the dielectric block 40, and a low-pass filter 80 connected in series with the signal transmission line 30. Since the low-pass filter itself also needs an electromagnetic compatibility cover (EMC cover) to achieve electromagnetic shielding, the integration of the low-pass filter and the phase shifter may share the grounding cavity 10, which reduces the size and improves the integration of the antenna system, thus making it possible to less consider the avoidance of components/signals during the layout design process. Since the implementation of the low-pass filter is relatively simple, for example, only a sheet metal part 50 and a dielectric block 60 that wraps the sheet metal part are used, so the integration with the phase shifter is also relatively simple. In some operating frequencies, the dielectric block 60 is not needed, and only the sheet metal part 50 is used as a low-pass filter. Continue to use the size, dielectric constant and other parameters in the specific scene in the embodiment shown in FIG. 5, when the low-pass filter is integrated, the size of the phase shifter changes from 40 mm*25 mm*8 mm (length*width*height) to 55 mm*25 mm*8 mm (length*width*height), which is slightly reduced compared to the addition of the sizes of a separate low-pass filter and a separate phase shifter. More importantly, the improvement of integration reduces the avoidance to be considered when laying out the board, thereby reducing the difficulty of laying out the board.

The above phase shifter embodiment in the present disclosure adopts an air strip line as a signal transmission line. Compared with a microstrip line, it reduces the loss of the phase shifter while also reducing the PIM effect. Rotating dielectric (i.e., circular-like dielectric block with gradually changing thickness) is used around the signal transmission line, so that the relative dielectric constant is changed based on the rotation of the dielectric instead of sliding, which saves the extension space required for the sliding of the dielectric block and obtains a continuously adjustable small-size phase shifter, making it easier to realize the miniaturization of the base station antenna. This is also well confirmed by the specific values given above. Furthermore, the phase shifter in the above embodiment may integrate the low-pass filter in the same cavity, which not only further reduces the space, but also facilitates the design of the layout.

The embodiment of the present disclosure also provides an antenna, including the dielectric rotating type phase shifter in the embodiment of the present disclosure. The antenna may be a base station antenna, and the phase shifter included in it has the same or corresponding functions and effects as the phase shifter of the present disclosure. Therefore, the content not described in detail in this embodiment can be referred to the above format example, thus omitted here.

The embodiment of the present disclosure also provides a base station, including the base station antenna in the foregoing embodiments. The base station may be a light base station integrating a remote module and an antenna module, or a traditional base station including a baseband unit. The phase shifter on the base station antenna also has the same or corresponding functions and effects as the phase shifter of the present disclosure.

It should be noted that in this context, relational terms such as “first” and “second” are only used to distinguish one entity or operation from another entity or operation, and do not necessarily require or imply any such actual relationship or sequence exists between these entities or operations. Moreover, the terms “include”, “comprise” or any other variants thereof are intended to cover non-exclusive inclusion, so that a process, method, article or device including a series of elements not only includes those elements, but also includes other elements that are not explicitly listed; or, it also includes the inherent elements of the process, method, article or device. Without more restrictions, the element defined by the expression “including a . . . ” does not exclude the existence of other same elements in the process, method, article, or device that includes the element.

The above are only specific implementations of the present disclosure, so that those skilled in the art can understand or implement the present disclosure. Various modifications to these embodiments will be obvious to those skilled in the art, and the general principles defined herein can be implemented in other embodiments without departing from the spirit or scope of the present disclosure. Therefore, the present disclosure will not be limited to the embodiments described herein, but should conform to the widest scope consistent with the principles and novel features disclosed herein.

The invention claimed is:

1. A phase shifter, comprising:
- a cavity;
- a dielectric phase shifting unit located in the cavity;
- a signal transmission line located in the cavity, the dielectric phase shifting unit being located between a shell of the cavity and a part of the signal transmission line; and
- the phase shifter further comprising a low-pass filter connected in series with the signal transmission line and located in the cavity,
- wherein the low-pass filter comprises a sheet metal part,
- wherein the low-pass filter further comprises a dielectric block wrapping the sheet metal part,
- wherein the dielectric phase shifting unit comprises a first dielectric block with a circular cross section and a thickness gradually changed with a circle center as a center.

2. The phase shifter of claim 1, further comprising a rotating shaft located at a shaft center of the first dielectric block, so that the first dielectric block rotates with the circle center as the shaft center.

3. The phase shifter of claim 2, wherein
- the dielectric phase shifting unit further comprises a second circular dielectric block having the thickness gradually changed with the circle center as the center, and mirror-symmetrical to the first dielectric block;
- the part of the signal transmission line is located between the first dielectric block and the second dielectric block, forming a pair of dielectric blocks; and
- the rotating shaft connects the circle centers of the first dielectric block and the second dielectric block.

4. The phase shifter of claim 2, further comprising a gear located outside the cavity and combined with the rotating shaft so that the rotating shaft drives the dielectric block to rotate with the rotation of the gear.

5. The phase shifter of claim 1, wherein an overlapping portion of the signal transmission line and the dielectric phase shifting unit is curved back and forth.

6. The phase shifter of claim 1, wherein the signal transmission line is gate-shaped, and the first dielectric block and the second dielectric block is located on one side of the gate-type signal transmission line; and the phase shifter further comprises another pair of dielectric blocks and a matching rotating shaft, located on an opposite side to the side where the first dielectric block and the second dielectric block is located.

7. An antenna unit comprising the phase shifter of claim 1.

8. A base station comprising an antenna unit, wherein the antenna unit comprises the phase shifter of claim 1.

9. The base station of claim 8, wherein the phase shifter further comprises a low-pass filter connected in series with the signal transmission line and located in the cavity.

* * * * *